(12) United States Patent
Doucette et al.

(10) Patent No.: US 8,861,875 B1
(45) Date of Patent: Oct. 14, 2014

(54) METHOD AND APPARATUS FOR ENCODING CHANGED IMAGE REGIONS

(75) Inventors: Daniel Jean Donat Doucette, Port Moody (CA); Sergey Zhuravlev, Richmond (CA)

(73) Assignee: Teradici Corporation, Burnaby, B.C. (CA)

( * ) Notice: Subject to any disclaimer, the term of this patent is extended or adjusted under 35 U.S.C. 154(b) by 551 days.

(21) Appl. No.: 13/194,728

(22) Filed: Jul. 29, 2011

(51) Int. Cl.
*G06K 9/36* (2006.01)

(52) U.S. Cl.
USPC ....... 382/232; 382/233; 382/132; 375/240.16

(58) Field of Classification Search
USPC ............... 382/239, 166, 323, 232, 233, 132; 345/544, 531, 555, 501, 530, 545, 520, 345/563
See application file for complete search history.

(56) References Cited

U.S. PATENT DOCUMENTS

| | | | |
|---|---|---|---|
| 4,646,161 A | | 2/1987 | Tsuchiya et al. |
| 6,535,238 B1 * | | 3/2003 | Kressin ...................... 348/14.01 |
| 6,664,969 B1 * | | 12/2003 | Emerson et al. ............. 345/544 |
| 7,271,374 B2 | | 9/2007 | Maguire |
| 7,289,123 B2 * | | 10/2007 | Duggan et al. ................ 345/469 |
| 7,499,593 B2 * | | 3/2009 | Yamaguchi .................... 382/233 |
| 8,126,059 B2 * | | 2/2012 | Yagi et al. ................ 375/240.16 |
| 8,477,146 B2 * | | 7/2013 | Xiang et al. ................... 345/569 |
| 2002/0031246 A1 * | | 3/2002 | Kawano ........................ 382/132 |
| 2007/0092006 A1 * | | 4/2007 | Malayath ................ 375/240.16 |
| 2008/0123915 A1 * | | 5/2008 | Nagy ............................ 382/128 |
| 2010/0027881 A1 * | | 2/2010 | Kim et al. ..................... 382/166 |

OTHER PUBLICATIONS

"Using Checksum to Reduce Power Consumption of Display Systems for Low-Motion Content" Kyungtae Han, et al., Intel Labs, Hillsboro, OR, IEEE Conference, 2009, pp. 47-53.

* cited by examiner

*Primary Examiner* — Mekonen Bekele
(74) *Attorney, Agent, or Firm* — Moser Taboada

(57) ABSTRACT

A method of encoding an input image divided into a set of image blocks and stored in computer readable memory. In one embodiment, the method comprises determining a sequence of block test patterns, each (i) identifying, for each image block of the set, a separate portion of the image block; and (ii) determined to minimize a maximum unidentified portion size of the input image when used on all image blocks of the set; assembling an active block test pattern comprising one of the block test patterns; comparing, based on the active block test pattern, at least one image block of the set with a reference image comprising a previously encoded copy of the input image to generate a block change detection; and encoding, based on the block change detection, a changed image block of the at least one image block to generate a portion of an encoded image.

18 Claims, 9 Drawing Sheets

FIG. 5

| 510-1 | 520-2 | 530-3 | 540-4 |
|---|---|---|---|
| 520-1 | 510-2 | 540-3 | 530-4 |
| 530-1 | 540-2 | 510-3 | 520-4 |
| 540-1 | 530-2 | 520-3 | 510-4 |

| 610-1 | 640-2 | 620-3 | 650-4 | 630-5 |
|---|---|---|---|---|
| 620-1 | 650-2 | 630-3 | 610-4 | 640-5 |
| 630-1 | 610-2 | 640-3 | 620-4 | 650-5 |
| 640-1 | 620-2 | 650-3 | 630-4 | 610-5 |
| 650-1 | 630-2 | 610-3 | 640-4 | 620-5 |

| 710-1 | 730-2 | 720-3 | 740-4 | 750-5 | 760-6 |
|---|---|---|---|---|---|
| 720-1 | 750-2 | 710-3 | 760-4 | 730-5 | 740-6 |
| 730-1 | 760-2 | 740-3 | 720-4 | 710-5 | 750-6 |
| 740-1 | 710-2 | 730-3 | 750-4 | 760-5 | 720-6 |
| 750-1 | 720-2 | 760-3 | 710-4 | 740-5 | 730-6 |
| 760-1 | 740-2 | 750-3 | 730-4 | 720-5 | 710-6 |

| 810-1 | 860-2 | 840-3 | 820-4 | 870-5 | 850-6 | 830-7 |
|---|---|---|---|---|---|---|
| 820-1 | 870-2 | 850-3 | 830-4 | 810-5 | 860-6 | 840-7 |
| 830-1 | 810-2 | 860-3 | 840-4 | 820-5 | 870-6 | 850-7 |
| 840-1 | 820-2 | 870-3 | 850-4 | 830-5 | 810-6 | 860-7 |
| 850-1 | 830-2 | 810-3 | 860-4 | 840-5 | 820-6 | 870-7 |
| 860-1 | 840-2 | 820-3 | 870-4 | 850-5 | 830-6 | 810-7 |
| 870-1 | 850-2 | 830-3 | 810-4 | 860-5 | 840-6 | 820-7 |

| 910-1 | 960-2 | 930-3 | 980-4 | 950-5 | 920-6 | 970-7 | 940-8 |
|-------|-------|-------|-------|-------|-------|-------|-------|
| 920-1 | 970-2 | 940-3 | 910-4 | 960-5 | 930-6 | 980-7 | 950-8 |
| 930-1 | 980-2 | 950-3 | 920-4 | 970-5 | 940-6 | 910-7 | 960-8 |
| 940-1 | 910-2 | 960-3 | 930-4 | 980-5 | 950-6 | 920-7 | 970-8 |
| 950-1 | 920-2 | 970-3 | 940-4 | 910-5 | 960-6 | 930-7 | 980-8 |
| 960-1 | 930-2 | 980-3 | 950-4 | 920-5 | 970-6 | 940-7 | 910-8 |
| 970-1 | 940-2 | 910-3 | 960-4 | 930-5 | 980-6 | 950-7 | 920-8 |
| 980-1 | 950-2 | 920-3 | 970-4 | 940-5 | 910-6 | 960-7 | 930-8 |

900

METHOD AND APPARATUS FOR ENCODING CHANGED IMAGE REGIONS

BACKGROUND OF THE INVENTION

1. Field of the Invention

Embodiments of the present invention generally relate to image sequence encoding, and, more specifically, to determining changed image data in successive frames of an image sequence in advance of encoding the changed image data.

2. Description of the Related Art

Updates applied to a data structure such as a frame buffer containing image content may be detected using several methods. A simple yet processing intensive approach is to systematically scan the current frame in a continuous sequence, such as a 'raster scan' or an 'M-Scan', comparing each element (e.g., Red, Green, Blue (RGB) pixel value) of the current frame with the corresponding element of a previous frame during the scan. A more efficient approach involves the monitoring of software instructions tasked with such frame updates, the arguments of which may provide information on where the updates are applied. However, such an approach is generally only available on platforms with open software architectures. Yet another approach comprises monitoring change detection registers or checksum hardware associated with the memory regions. By monitoring 'dirty bits' or changes to checksums, it is possible to determine that memory pages associated with a frame have been overwritten. Such an approach necessitates the availability of specialized support hardware in the memory management unit (MMU) of the computer system and generally mandates support from the operating system which increases processing overheads.

Additional challenges exist in some modern computing systems that provide the ability for third party software to access managed data structures, such as frame buffers containing image content. Access to such data structures is provided without accompanying support data or other explicit means for determining the location of changed elements in the data structure when it is updated. Raster scanning of such data structures to determine changes in preparation for other image processing is particularly problematic in real time systems which are sensitive to any additional Central Processing Unit (CPU) consumption or processing delays. Virtualized systems are particularly sensitive to CPU consumption overheads as the associated CPU resources are preferably released for use by other system processes (e.g., other virtual machines).

Therefore, there is a need in the art for efficiently determining changes to data structures such as those comprising interactive images or streamed image sequences.

SUMMARY OF THE INVENTION

Embodiments of the present invention generally relate to a method of encoding an input image divided into a set of image blocks and stored in computer readable memory and to a computer readable medium for performing such method. In one embodiment, the method comprises determining a sequence of block test patterns, each block test pattern of the sequence (i) identifying, for each image block of the set, a separate portion of the image block; and (ii) determined to minimize a maximum unidentified portion size of the input image when used on all image blocks of the set; assembling, by a computer, an active block test pattern comprising one of the block test patterns of the sequence; comparing, by the computer, based on the active block test pattern, at least one image block of the set with a reference image comprising a previously encoded copy of the input image to generate a block change detection; and encoding, by an encoder, based on the block change detection, a changed image block of the at least one image block to generate a portion of an encoded image.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 is a block diagram of one embodiment of a repeating sequence of four test patterns that minimizes the area of the maximum untested continuous rectangle;

FIG. 6 is a block diagram of one embodiment of a repeating sequence of five test patterns;

FIG. 7 is a block diagram of one embodiment of a repeating sequence of six test patterns;

FIG. 8 is a block diagram of one embodiment of a repeating sequence of seven test patterns;

FIG. 9 is a block diagram of one embodiment of a repeating sequence of eight test patterns;

DETAILED DESCRIPTION

Figure 1:
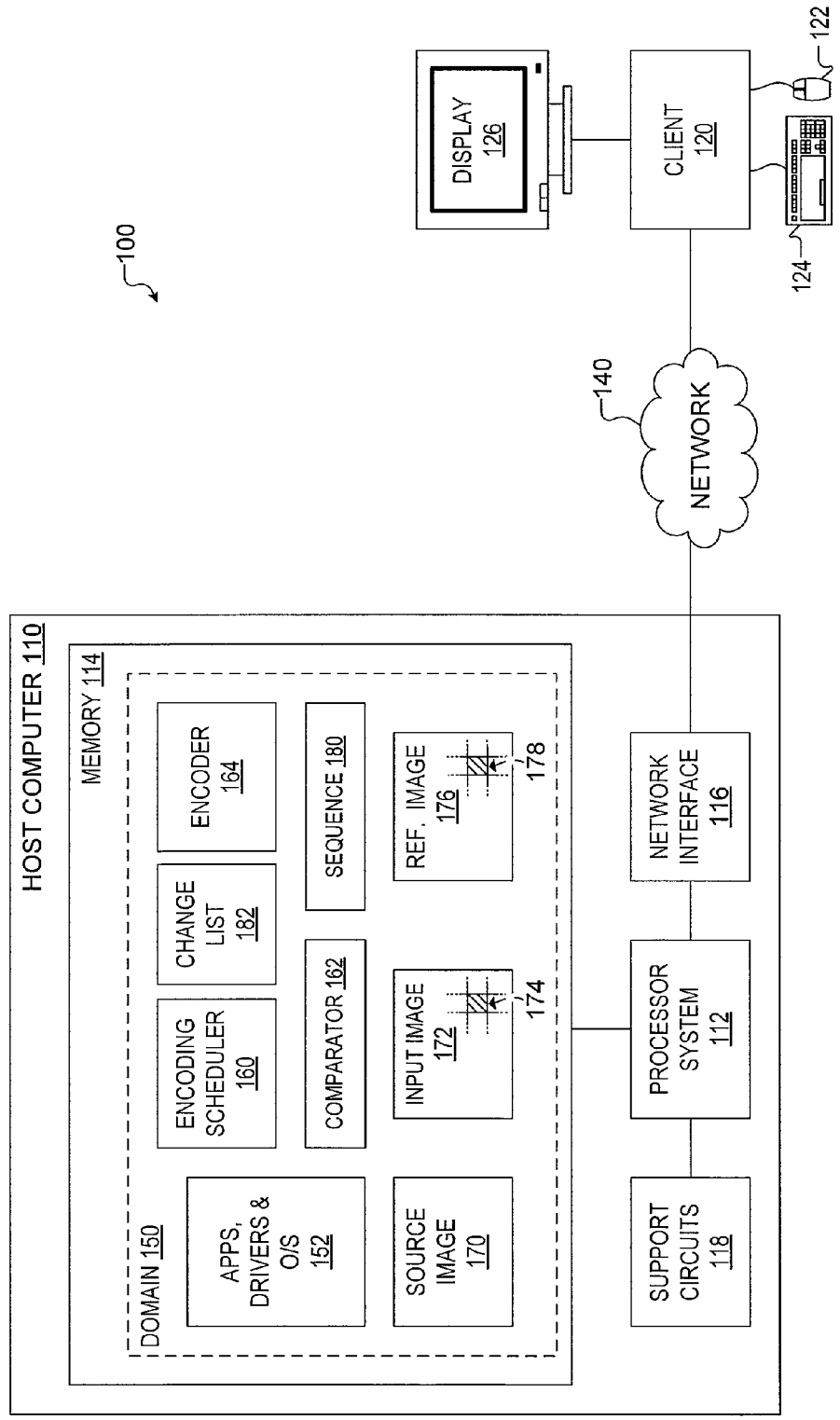
FIG. 1 is a block diagram of an image sequence communication system enabled for encoding of changed image regions in accordance with one or more embodiments of the present invention.

The invention may be implemented in numerous ways, including as a process, an article of manufacture, an apparatus, a system, and as a set of computer-readable descriptions and/or instructions embedded on and/or in a computer-readable medium such as a computer-readable storage medium. In this specification, these implementations, or any other form that the invention may take, may be referred to as techniques. The Detailed Description provides an exposition of one or more embodiments of the invention that enable improvements in features such as performance, power utilization, cost, scalability, efficiency, and utility of use in the field identified above. The Detailed Description includes an Introduction to facilitate the more rapid understanding of the remainder of the Detailed Description. The invention encompasses all possible modifications and variations within the scope of the issued claims.

The term processor as used herein refers to any type of processor, central processing unit (CPU), microprocessor, microcontroller, embedded processor, media processor, graphics processor, or any other programmable device capable of executing and/or interpreting instructions in a form of software (such as microcode, firmware and/or programs).

The term software as used herein refers to any type of computer-executable instructions for any type of processor, such as programs, applications, scripts, drivers, operating systems, firmware, and microcode. Computer-executable instructions include any types of instructions performed by a processor, such as binary instructions that are directly performed, instructions that are translated and/or decoded prior to being performed, and instructions that are interpreted.

INTRODUCTION

The present invention discloses a system and method for determining the location(s) of changes to image data of a source image, typically stored as two dimensional (2D) pixel data arrays in frame buffer structures of computer memory. Once changes to the image data have been located, the identified changed pixels are subjected to time critical processing including, for example, image compression prior to transmitting the image data to a client computer for display. In order to minimize delays incurred between when pixels of the source image are updated by graphics software and when such pixel updates are detected, a suitable sequence of block test patterns that determines how the source image is tested for changes is applied to the image. The selected sequence of block test patterns determines the rate at which, and the order in which, test portions of an input image (generally a facsimile of the source image) are compared with corresponding test portions of a known reference image, providing deterministic test coverage of the frame buffer. In various embodiments, the availability of CPU resources, current network bandwidth availability or target system latency criteria are evaluated and an appropriate sequence of block test patterns is selected accordingly.

FIG. 1 illustrates selected details of an embodiment of an image sequence communication system 100 ("system 100") for remote display of one or more computer images. System 100 comprises a host computer 110, such as a computer server, personal computer or the like, coupled to and enabled to communicate with one or more communication endpoints, such as client computer 120 ("client" 120), by an Internet Protocol (IP) packet network 140. Other embodiments of system 100 comprise host computer 110 coupled to a plurality of clients 120, or host computer 110 coupled to alternative communications endpoints, such as one or more image storage systems or various combinations of display and storage endpoints.

Host computer 110 ("computer 110") is, generally, a computer or system of computers designated for running software associated with one or more communication endpoints. Such executable software stored in the form of machine-readable instructions in memory 114 comprises operating system, driver software and application software, depicted as "APPS, DRIVERS & O/S" software 152 ("software" 152) in addition to various encoding functions utilized by processor system 112 to execute the methods described herein. Software 152 generally comprises functions and associated data structures known in the art enabled to maintain a source image 170, such as a computer desktop display image associated with the client 120. Source image 170 is typically arranged in one or more frame buffers as a two-dimensional raster of pixels in Red-Green-Blue (RGB) format. Well known application software includes one or more executable applications with image display presentation or storage requirements, such as word processing software, spreadsheets, financial data presentation, video/photo editing software, graphics software such as Computer Aided Design (CAD) software, Desktop Publishing (DTP) software, digital signage software, or the like. Well known operating systems include a WINDOWS operating system from MICROSOFT, Inc. (e.g., WINDOWS XP, WINDOWS VISTA or WINDOWS 7); LINUX or UNIX operating system available from many vendors; or OSX operating system from APPLE CORPORATION.

In a virtualized operating system embodiment, the domain 150 is a virtual machine or similar 'computing process' of computer 110 comprising the data structures necessary to execute an interdependent set of processes (i.e., software applications) scheduled by a hypervisor (not depicted in FIG. 1). The hypervisor coordinates the execution schedule of the domain 150 and the interaction of the domain 150 (and other domains) with various hardware components, for example, by ensuring non-overlapping memory ranges available to each domain in the system and enabling address translation required to isolate the physical address space of processor system 112 from the logical addresses utilized by software applications. Examples of commercially available hypervisor products include ESX products from VMWARE Corporation, XENSERVER from CITRIX Corporation and HYPER-V from MICROSOFT Corporation. In such virtualized operating system configurations, each from a set of clients 120 is associated with a different domain 150 of host computer 110. In other embodiments, such as select terminal services or virtualized application environments, multiple clients 120 are associated with a common operating system resource and application software is either virtualized or enabled with multi-instance capabilities, producing separate source images for each of the associated client computers. Further embodiments comprise a single operating system associated with a single client 120 in which case multiple operating system domains need not be present.

In an embodiment, computer 110 comprises processor system 112 coupled to memory 114 and network interface 116 by one or more bus structures, such as memory and/or I/O busses known to the art, facilitated by support circuits 118. In various embodiments, processor system 112 comprises one or more CPUs, one or more graphic processor units (GPUs), or a combination of CPU and GPU processing elements communicatively coupled to computer memory and peripheral device interfaces (e.g., Universal Serial Bus (USB), audio and Peripheral Component Interconnect (PCI)) using various well known support circuits 118, such as north bridge, south bridge, power supplies, clock circuits, data registers, I/O interfaces, and other support circuits including at least one of address, control, interrupt and/or data connections, controllers, data buffers, drivers, repeaters, and receivers, to enable appropriate communications between the elements of host computer 110. Examples of a well known suitable CPU include OPTERON, XEON, POWERPC or SPARC server microprocessors; other server, mobile or workstation class CPUs manufactured or licensed by the likes of AMD Corporation, INTEL or ARM Holdings or any other microprocessor platform enabled to run the software described herein. Memory 114 comprises any one or combination of volatile computer readable media (e.g., random access memory (RAM), such as dynamic random access memory (DRAM), static random access memory (SRAM), extreme data rate (XDR) RAM, Double Data Rate (DDR) RAM, and the like) and nonvolatile computer readable media (e.g., ROM, hard drive, tape, CDROM, DVDROM, magneto-optical disks, Erasable Programmable Read-Only Memory (EPROM), Electrically Erasable Programmable Read-Only Memory (EEPROM), Flash EPROM, and the like).

In various embodiments, encoding scheduler 160, comparator 162 and encoder 164 comprise machine executable software functions that locate and encode updates to source image 170. Such updates to source image 170 are generally performed by software 152 in response to a user located at client 120 interacting with application software using a mouse 122 and/or keyboard 124. The method described below enables encoding scheduler 160 to manage the user experience which is typically defined by the quality of the image at display 126 and the round trip latency measurement between an input event (e.g., mouse movement) initiated by the user and subsequent related display update event (e.g., change in image on display 126). In some embodiments, at least part of encoder 164 is implemented as part of a processor, such as part of an Application Specific Integrated Circuit (ASIC), Field Programmable Gate Array (FPGA), System on Chip (SoC) or embedded processor attached to processor system 112 (e.g., via a Peripheral Component Interconnect (PCI) Express bus) and configured, at least in part, as a logic circuit to perform image encoding; other processors and/or electronic hardware suitable for performing image encoding; or any combination of the foregoing.

Input image 172 is a copy of at least a portion of source image 170, scheduled for capture by encoding scheduler 160 on a periodic basis (e.g., a 30 Hz capture cycle) and/or in response to an indication provided by software 152 that source image 170 has been updated. In some embodiments input image 172 is scheduled for capture based on the state of encoder 164 and/or network interface 116 such that the encoding rate of source image 170 is regulated by bandwidth availability on network 140. Reference image 176 is a previous copy of input image 172, scheduled for capture by encoder 164 after changes located in current input image 172 have been encoded. Input image 172 and reference image 176 are each partitioned into corresponding arrays of image blocks, such as blocks comprising 4×4 or 8×8 pixels (i.e., block 174 in image 172 is at the same location as block 178 located in reference image 176). Comparator 162 utilizes a repeating sequence of block test patterns 180 (determined by encoding scheduler 160) to systematically seek changed blocks in input image 172 by comparing select pixels in each block of input image 172 to corresponding select pixels of reference image 176. Change list 182, a data record comprising location information for changed blocks in input image 172, is updated to reflect any block determined to have changed since previously encoded.

Encoder 164 is enabled to encode image blocks of input image 172 as reported in change list 182. Generally, encoder 164 is scheduled by encoding scheduler 160 to encode changed blocks of each input image following the generation of change list 182 for a particular image frame or selection thereof. In different embodiments, encoder 164 is optimized for encoding of horizontal image slices, entire image frames or arbitrary regions indicated by change list 182. In an embodiment, encoder 164 comprises image classification, lossless and lossy image encoders, and stream assembly functions known in the art suitable for processing changed blocks in preparation for communication as IP-encapsulated encoded image blocks over network 140. In an embodiment, encoder 164 classifies changed blocks as background image type (e.g., a constant color background), object image type (e.g., text font pixels on a constant color background) or picture image type (e.g., low contrast content). Such classification is performed by applying pixel filters and/or deriving image characteristics from drawing commands or other metadata provided by software 152. Blocks of background or object image type are compressed using at least one of a Golomb encoder, Rice encoder, Huffman encoder, variable length encoder (VLC), context-adaptive VLC Lempel-Ziv-Welch (LZW) encoder or context-adaptive binary arithmetic encoder (CABAC)). In some embodiments, encoder 164 maintains block state information that enables residual encoding of unchanged image blocks, previously classified as picture image type. Blocks of picture image type are generally encoded using one of a progressive Discrete Wavelet Transforms (DWT), Discrete Cosine Transform (DCT) or a Joint Photographic Expert Group (JPEG) encoder type. The encoded image blocks are assembled into a sequence of network frames for communication to client 120. If a best-efforts network protocol such as User Datagram Protocol (UDP)/IP is utilized, frame headers comprise sequence information (i.e., ordering) that enables reordering at client 120 and retransmission of lost packets if desired. In an embodiment, lossless and lossy content associated with the same current input image 172 are synchronized within the image stream to prevent tearing artifacts in the decoded image at client 120. Following encoding, encoder 164 updates reference image 176 and resets change list 182.

Memory 114 may also store other data structures not depicted in FIG. 1, including remote computing session management functions, remote I/O termination functions (e.g., USB-over-IP protocol stack), a network stack enabled to control network interface 116, a network bandwidth monitor enabled to provide encoding scheduler 160 with network availability information (e.g., packet loss statistics, latency measurements and the like), a processor system monitor enabled to provide encoding scheduler 160 with CPU and memory utilization information and other state information, registers and machine-readable instructions associated with the implementation of a remote computing session. In some embodiments, memory 114 stores one or more Direct Memory Access (DMA) transfer lists executed by DMA controller resources of processor system 112 to copy image content from processor system 112 to memory 114, copy data between the various data structures of memory 114, and move assembled frames to network interface 116.

In an embodiment, network interface 116 provides compatibility with the network 140 by executing a reliable protocol stack such as Transmission Control Protocol (TCP)/IP and/or best efforts protocol stack such as UDP/IP. In addition to enabling the communication of encoded image blocks, the network interface 116 provides information relating to network components, such as network capacity, communications statistics, or bandwidth availability information, to encoding scheduler 160 and encoder 164. In one or more embodiments, the network interface 116 is coupled to a system bus of processor system 112 or, if encoder 164 is implemented in hardware, coupled directly to encoder 164.

The network 140 comprises a communication system (e.g., the Internet, local area network (LAN), wireless LAN, wide area network (WAN), and the like) that connects computer systems completely by wire, cable, fiber optic, and/or wireless links facilitated by various types of well-known network elements, such as hubs, switches, routers, and the like. In one embodiment, the network 140 may be a shared packet switched network that employs various well-known protocols (e.g., TCP/IP and the like) to communicate information amongst the network resources. For example, in various embodiments, the network 140 employs part of the Internet.

The client computer 120 is, generally, a computing device enabled to provide remote computing functions, such as presenting a computer desktop image (i.e., image data) on display 126, providing ports for connecting peripheral devices such as mouse 122 and keyboard 124, and providing a network interface for connection to network 140. For example, in an embodiment, client 120 is a terminal in a networked remote computer system 100. Examples of such remote terminals include zero client computers, thin client computers, personal computers, notebook computers, workstations, Personal Digital Assistants (PDAs), wireless devices, integrated monitors, and the like. Client 120 comprises various session management and media processing resources for encoding or decoding media associated with a remote computing session. In an embodiment, client 120 comprises at least one of an image decoder for decoding a stream of encoded image blocks received from the host computer 110; an audio decoder for decompressing output audio data; an audio encoder for compressing input audio data; or a USB codec. Such a USB codec may be used for managing the translation of USB data between format requirements of one or more underlying USB bus controllers and format requirements suitable for standard network communication, such as USB Request Block (URB) format used in USB-over-IP protocols known to the art. These codec functions and communication protocols are complementary to related codec functions and communication protocols executed by host computer 110. The client 120 comprises User Interface (UI) sub-system, typically including a display 126 and additional UI devices. Display 126 is any screen type device (e.g., liquid crystal display (LCD), cathode ray tube (CRT), or the like) that displays images. In some embodiments, the client 120 connects to a plurality of displays, for example using display connections such as Video Graphics Adapter (VGA) Digital Visual Interface (DVI) or DisplayPort connections. Additional UI devices generally include a mouse 122, keyboard 124, audio devices, and/or other devices such as biometric peripherals, webcam, printers, and the like. Such devices are generally coupled to the client 120 by industry compliant connections, such as USB, Sony Philips Digital Interconnect Format (S/PDIF), and the like. The client 120 comprises session management functions used for the establishment and maintenance of a secure remote computing session with host computer 110. Such session management functions include functions for requesting session establishment (for example, responsive to a user applying power or pressing a "connect" button), network address translation (NAT) functions, codec negotiation functions, and security protocols, such as session authentication and encryption protocols complementary with authentication and encryption methods deployed by host computer 110.

Figure 2:
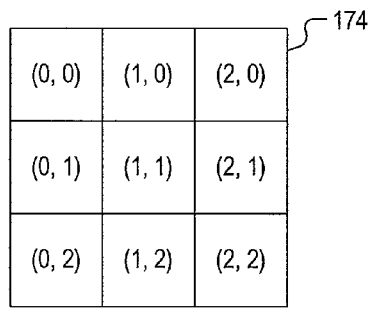
FIG. 2 is a block diagram of one embodiment of a 3×3 pixel image block.

FIG. 2 is an illustration of image block 200 which is an embodiment of image block 174 comprising a 3×3 array of pixels. For sake of convention, the pixels of block 200 are referenced according to (x,y) location; the left-most column comprising pixels (0,0), (0,1) and (0,2) and so on as indicated in FIG. 2.

Figure 3:
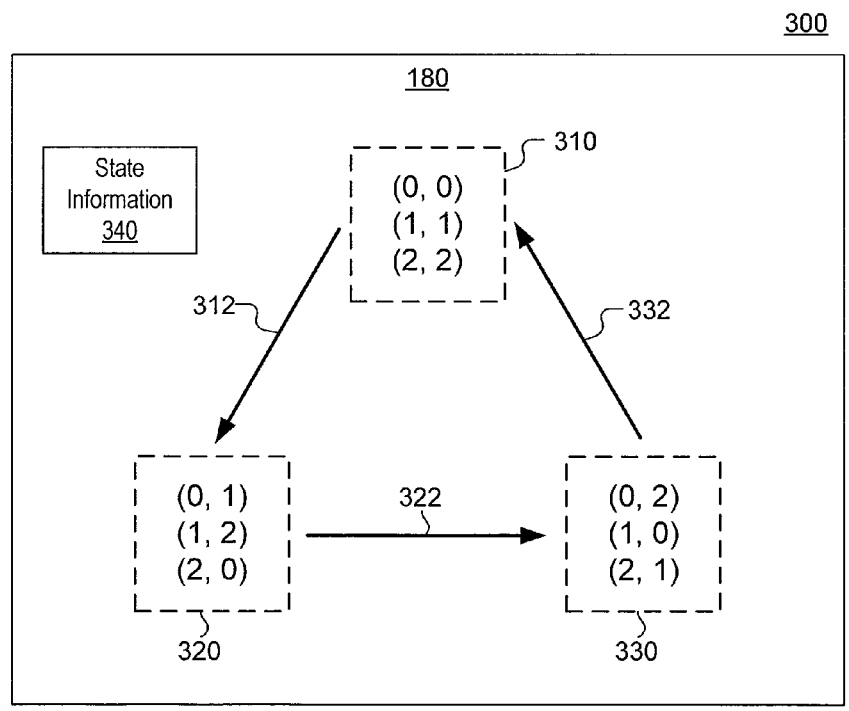
FIG. 3 is a block diagram depicting one embodiment of a repeating sequence of three test patterns.

FIG. 3 is an illustration of a repeating sequence 300 of block test patterns 310, 320 and 330. Repeating sequence 300 is an embodiment of repeating sequence 180 in FIG. 1 suitable for application to a 3×3 image block. Each of the block test patterns 310, 320 and 330 identifies a separate portion of input image block 200 (i.e., a separate portion of subject image block 200) to compare with the corresponding portion of the reference image block 178. Test coverage of the entire image block 200 is guaranteed following three sets of comparison operations, each of the comparison operations comprising a test of three designated pixels of image block 200 against their corresponding pixels in the reference image. The location of the three designated test pixels associated with each of the three sets of comparison operations and the sequential combination of comparison operations maximize the probability of detecting an image change to a subject image block 174 in input image 172. In an exemplary implementation, sequence 300 comprises a region of memory 114 (i.e., sequence 180) configured to store a set of pixel reference lists (i.e., block test patterns), a set of pointer structures that determine a comparison sequence (i.e., an order in which each in the set of pixel reference lists is retrieved) and a state information data structure enabled to track the active block test pattern associated with the current comparison test. Block test pattern 310 references pixels (0, 0), (1, 1) and (2, 2) in image block 200 associated with one set of comparison operations. Sequence pointer 312 points to block test pattern 320 which references pixels (0, 1), (1, 2) and (2, 0) in image block 200 associated with the next set of comparison operations. Sequence pointer 322 points to block test pattern 330 which references pixels (0, 2), (1, 0) and (2, 1) in image block 200 associated with the final set of comparison operations. Sequence pointer 332 points back to block test pattern 310. State information 340 tracks the active block test pattern by providing a reference to pattern 310, pattern 320 or pattern 330 according to current state.

In embodiments comprising image blocks of greater dimensions than 3×3 pixels, repeating sequence 180 is generated according to test coverage requirements. For example, in an embodiment comprising 4×4 image blocks, repeating sequence 180 might comprise 8 block test patterns, each block test pattern referencing 2 pixels or 4 block test patterns, each block test pattern referencing 4 pixels and so on. In select embodiments, atomic block test patterns (i.e., most sparse available test patterns) are combined on-the-fly in response to real-time performance targets (e.g., maximum change detection latency) in order to increase the number of comparison operations during each test. For example, repeating sequence 180 may comprise two block test patterns to cover a 4×4 image block, each of the two block test patterns referencing 8 of the 16 pixels in the image block. Block test patterns 500, 600, 700, 800 and 900 that maximize probability of detecting an image change for image blocks from 4×4 pixels up to 8×8 pixels are disclosed later in the present specification. In a rigorous mathematical sense, these block test patterns minimize the area of the maximum untested continuous rectangle on successive tests (i.e., successive sequential combinations of block test patterns), in consideration that each test is likely conducted across a contiguous area of image blocks. The maximum untested continuous rectangle defines the maximum size of an image feature that might remain undetected following an associated sequence of comparison operations. In other embodiments, block test patterns are specified according to the capabilities of processing system 112, such as support for efficient memory access operations and/or support for efficient data comparison operations. If processing system 112 is enabled for multiple concurrent comparison operations to be performed across multiple pixels (e.g., the CPU of system 112 comprises Single Instruction Multiple Data (SIMD) instruction capabilities), non-rectangular block test patterns defined by groups of pixels provide improved processing efficiency. In another embodiment in which processor system 112 is enabled to cache lines of pixels (e.g., rapid access to a cached line comprising 8×24-bit pixel values from each of input image 172 and reference image 176), a pixel interval and associated test pattern that take advantage of the cache line access are selected.

Figure 4:
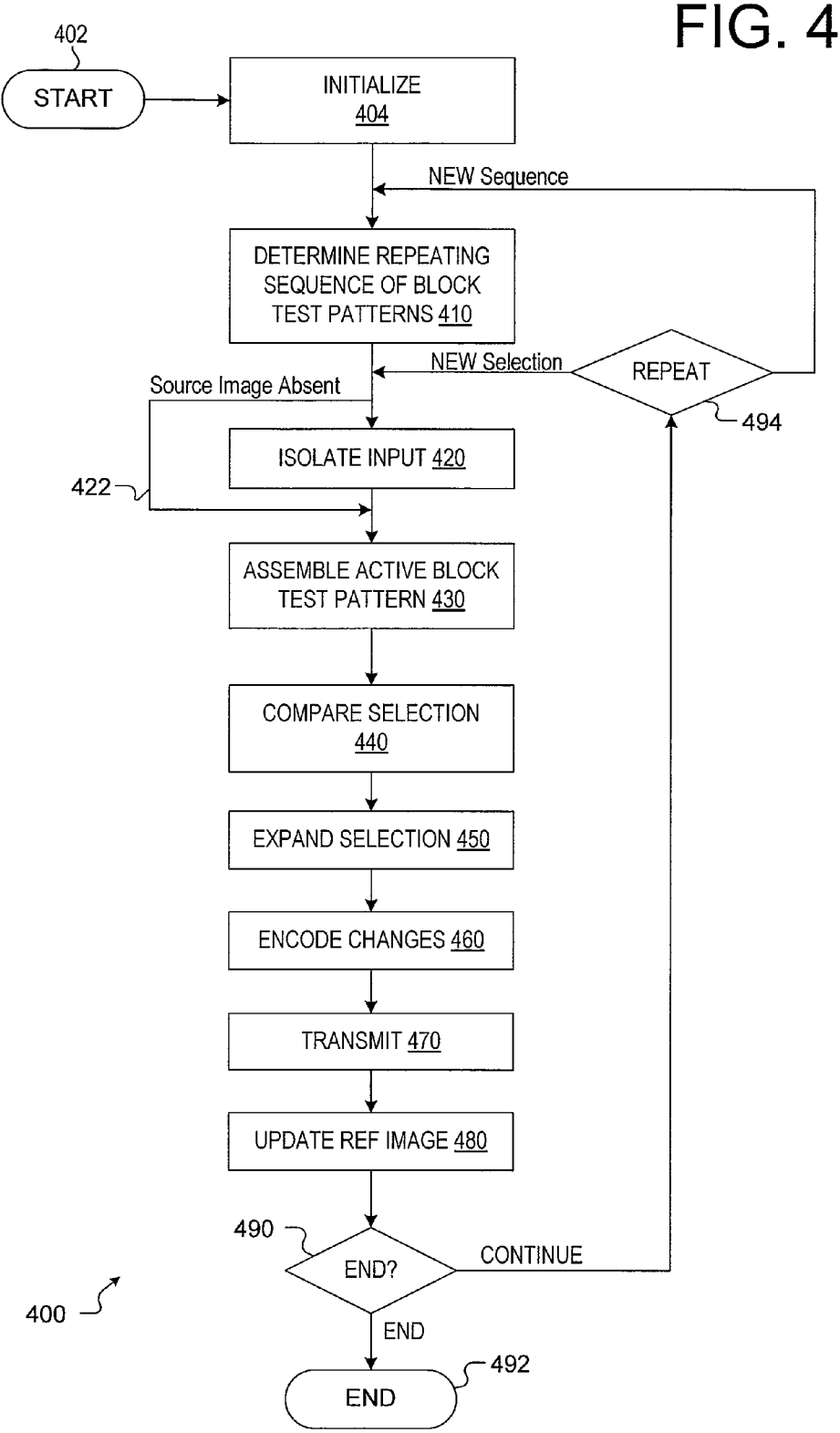
FIG. 4 is a flow diagram of a process for encoding an input image partitioned as a set of image blocks in accordance with one or more embodiments of the present invention.

FIG. 4 is a block diagram of a method 400 for encoding an input image partitioned as a set of image blocks in accordance with one or more embodiments of the present invention. In some embodiments, the input image comprises at least a portion (i.e., a selection of blocks) copied from a source image while in other embodiments application software updates the input image directly and a source image may not be present. While the embodiment of method 400 depicted is directed to encoding a sequence of computer display images associated with a remote computing environment, alternative embodiments of method 400 may be directed to solving the more general problem of efficiently detecting changes to data sets stored in computer memory, with particular applicability to media data such as rendered image sequences.

Method 400 starts at step 402 ("Start") and proceeds to step 404 ("Initialize"). In some embodiments, a pre-initialization step comprises the offline generation of one or more sets of block test patterns, such as one or more of the block test patterns associated with repeating sequences 500 thru 900 detailed below. Step 404 generally comprises initialization of hardware and memory structures, loading of block test patterns and establishment of a remote computing session between host computer 110 and client 120.

Method 400 proceeds to step 410 ("Determine Repeating Sequence of Block Test Patterns") in which memory 114 is configured with one or more sequences (i.e., sequences 180), such as repeating sequence 300 or a similar repeating sequence (e.g., an 8×8 sequence), comprising block test patterns suited to a particular computer instruction set, or suited to a particular cache memory architecture, and/or comprising different degrees of sparsity or different dimensions.

In an embodiment, the total number of block test patterns that make up the repeating sequence is determined according to the planned encoding frequency for input image 172. The encoding frequency may be planned according to historical encoder performance, historical bandwidth availability, the available processing bandwidth of processing system 112 or the predicted available network bandwidth used to transmit the image block once encoded. As an example, if the encoding frequency is constrained to 10 frames per second based on the available processing bandwidth, the repeating sequence is determined to comprise a total of 4 block test patterns if comprehensive test coverage (i.e., maximum delay before a pixel change is detected) for the entire input image 172 is desired within a 400 milliseconds (ms) period. As another example in which the encoded image transmission frequency is constrained to 20 frames per second based on the available network bandwidth, a total of 8 block test patterns are determined to accomplish the same 400 ms comprehensive test coverage. In an embodiment, the dimension of the test patterns and corresponding subject image block 174 are selected, at least in part, according to a desired number of iterations necessary to provide 100% test coverage of subject image block 174. For example, if a sample rate of 10 updates per second (i.e., 100 ms interval) is desired in conjunction with 100% test coverage provided within one second, a test pattern dimension of N=10 is determined. In such an embodiment, the dimension N is adjusted to the nearest value that matches the input block dimension capabilities of encoder 164 which are typically less flexible (e.g., N=8).

Method 400 proceeds to step 420 ("Isolate Input") performed in various embodiments in which a separate source image is present. In those embodiments in which source image 170 is absent (e.g., input image 172 is updated directly by software 152), step 420 is bypassed 422 and the method 400 proceeds to step 430.

At least a selection of the input image 172 (e.g., the entire input image 172 or a sub-section thereof) is isolated from the source image 170 to prevent changes to the selection of the input image 172 during forthcoming operations. Generally, such a 'selection' defines a region of contiguous input image blocks suited to the capabilities of encoder 164 (such as the entire frame, a horizontal slice across input image 172, or a vertical column) and/or a region specified based on block change history (e.g., a recently changed region related to a previous encoding cycle), a region associated with a particular display 126 or a region defined by an image feature such as a window surface identified by the operating system or graphics functions. Input image isolation may be accomplished by copying pixels from an identified selection of the source image 170 to corresponding locations in input image 172, using an efficient pixel transfer method such as Bit-Block Transfer (BLIT) services typically provided by underlying graphics functions. In different embodiments, image isolation step 420 (and subsequent comparison step 440 as described below) is typically initiated or scheduled in response to front-end timing requirements (such as drawing events and/or a periodic frame clock) or back-end timing requirements (such as the end of the previous frame encoding operation, which may itself be scheduled according to a desired frame rate, e.g., 30 Hz). Indicia of drawing events may include changes to MMU registers or hints provided by the operating system or graphics drivers that source image 170 has been updated. In those embodiments where copying the source image 170 to the input image 172 consumes an insignificant time proportion of method 400 and consequently has no impact on which particular active block test pattern should be assembled, step 420 may be performed following step 430.

Method 400 proceeds to step 430 ("Assemble Active Block Test Pattern") in which a single block test pattern from repeating sequence 180 is selected or an aggregation of block test patterns of repeating sequence 180 (e.g., pattern 310 aggregated with pattern 320, or pattern 320 aggregated with pattern 330) is assembled. The resultant single or composite block test pattern identifies those pixels of subject input image block 174 designated for test. An embodiment of such a composite block test pattern comprises a list that references those pixels designated for test. In an embodiment in which block test patterns are not aggregated, the next active block test pattern is selected according to the current state information (state information 340) and the associated sequence pointer. In some embodiments, all pixels of subject input image block 174 are guaranteed for test coverage within a specified time period by adjusting the sparsity of the assembled active block test pattern dependent on the elapsed period of time since the previous comparison operation pertaining to the same subject input image block. Sparsity may be decreased by assembling a composite block test pattern comprising an aggregation of atomic block test patterns (e.g., combining block test patterns 310 and 320 for a single test operation).

In select embodiments, the same repeating sequence 180 is used for each input image block 174 within a particular selection of input image. Different selections of input image 172 may be tested by active block test patterns at different phases in the repeating sequence (e.g., one selection may have active block test pattern 310 while a neighboring selection has active block test pattern 320). Such a phasing of active block test patterns reduces the time to detect changes to non-rectangular image features, such as narrow diagonal lines that traverse selection boundaries.

Method 400 proceeds to step 440 ("Compare Selection") in which, for the determined isolated selection of blocks in the input image 172, a subset of pixels, as determined by the active block test pattern, of each block of the isolated selection is compared to the corresponding pixels in the corresponding image block of the reference image 176. If source image 170 is absent (e.g., input image 172 is updated directly by software 152), updates to input image 172 should be deferred during comparison step 440. In an embodiment, each image block of the selection is in turn designated as the subject image block 174 and the subject image block 174 is compared to the corresponding reference image block 178. If the pixels differ (i.e., for an RGB pixel embodiment, a difference in value between any of the three R, G, or B component values in the subject input image block 174 and their corresponding components in the reference image block 178), a block change detection is generated, resultant in change list 182 being updated to identify the locations of image blocks changed in the input image 172. The determined isolated selection of blocks that are tested may be the entire frame, or may be sequential (e.g., consecutive slices from input image 172), or based on hints provided by operating system or MMU facilities, or based on a recent history of the block changes such that a region with a high probability of changed blocks is tested at a higher frequency than regions with a low probability of changed blocks In some embodiments, method 400 proceeds to step 450 ("Expand Selection"). In other embodiments, no expansion step is implemented and method 400 proceeds to step 460. In yet other embodiments, expansion is executed in tandem with compare step 440, typically on a block by block basis. Region expansion is typically implemented to limit image discontinuities at the borders of an image selection (e.g., the edge of a horizontal slice) resultant from a neighboring image selection being updated at a later time. Such discontinuities are particularly noticeable in the presence of image motion (such as a computer display window that is dragged across the screen or a document that is scrolled). If step 440 results in a positive block change detection for a pixel of a subject input image block 174 at the edge of a particular selection, step 450 comprises either expanding the comparison to a second selection one or more input image blocks 174 of the neighboring region outside the current selection or simply marking such change candidate blocks as changed blocks in list 182, in which case the change candidate blocks need to be verified (via bitwise pixel comparison against the reference image) as a pre-encoding step. Expanding the comparison may require that one or more additional image blocks be copied from the source image 170 to the input image 172 (i.e., the additional image blocks are isolated from the source image 170). Identified changed input image blocks 174 in the expansion region are marked in change list 182 and consequently encoded in conjunction with changed input image blocks 174 of the current selection.

Method 400 proceeds to step 460 ("Encode Changes") in which encoder 164 processes changed blocks of the current selection of input image 172, as indicated by change list 182, using one or more lossless and/or lossy encoding techniques known to the art. Packets comprising encoded image data (i.e., a portion of an encoded image) are generated for transmission to client 120.

In select embodiments, the encoding step 460 encodes changed blocks within the selection in addition to changed blocks in the expansion region as indicated in change list 182.

In other embodiments, change list 182 comprises a combination of block change detections (as confirmed by comparator 162) and candidate block change detections for select blocks which are not explicitly tested (e.g., as determined at step 450). Such a predictive strategy provides an effective method for reducing CPU utilization in various embodiments in which encoder 164 is implemented as an independent processing function (e.g., part of an ASIC) armed with processing circuitry enabled to confirm block changes (against a reference image) ahead of block encoding functions.

The steps of assembling an active block test pattern (step 430), comparing a selection of blocks of the input image to the reference image (step 440) and encoding changed image blocks (step 460) may be executed based on timing that is independent of the timing (e.g., schedule or event driven timing) used to modify the source and/or input images. In one embodiment, the timing of steps 430, 440 and 460 is determined by encoding scheduler 160 according to predicted network availability whereas the timing of updates to source image 170 is determined by software 152.

Method 400 proceeds to step 470 ("Transmit") in which packets of encoded image data are encapsulated using suitable transport and Media Access Control (MAC) layer protocols (e.g., UDP/IP or TCP/IP) and Ethernet, and transmitted via network interface 116 to client 120 where complementary decoding facilities generate a client image for display. In instances of high network bandwidth availability, step 470 may not significantly impact the overall latency associated with cycling through the full set of test patterns in sequence 180. If latency control is desired, the determination of the most suitable active block test pattern may be largely dependent on the variable delay incurred by encoding step 460. However, in instances of limited network bandwidth availability, the determination of the most suitable active block test pattern is typically dependent on the combination of variable delay incurred by encoding step 460 and transmission delay associated with step 470.

Method 400 proceeds to step 480 ("Update Reference Image") in which changed blocks of input image 172 (as assigned in change list 182) are copied to the corresponding locations of reference image 176. In some embodiments, the reference image 176 is updated prior to encoding step 460.

Method 400 proceeds to step 490 ("End?"), where it is determined if at least part of method 400 should be repeated (i.e., additional encoding is required) or if method 400 should be terminated. If additional encoding is required, method 400 proceeds to branch 494.

Generally, method 400 returns (via branch 494) from step 490 to step 420. Responsive to an event (such as a function call from encoding scheduler 160, a timer event or notification of source image update) a new selection of source image 170 (e.g., the next frame, the next slice in the current frame, or the like) is copied to input image 172. The comparison operation is repeated using the same active block test pattern, although as previously described, neighboring selections use different phases of a sequence 180 in some embodiments that operate on sub-frame selections. After an entire frame has been tested using the current active block test pattern, the comparison and encoding steps are repeated using the next block test pattern in sequence 180.

In some embodiments enabled to track rapid image changes in select areas of the image, the entire input image 172 is selected using one repeating sequence of block test patterns; thereafter, one or more limited regions of input image 172 previously identified as changed in the previous test(s) are selected for test for a determined set of subsequent cycles, followed by the entire input image 172 being tested again. In other embodiments, a region identified as having all pixels changed for a sequence of consecutive tests is assumed to be of video image type and automatically marked as changed for a determined period in order to reduce processing overhead associated with step 440.

In some embodiments, such as in response to a system configuration change in which a different set of atomic test patterns is required (e.g., reduced power mode or changed performance requirements), method 400 returns to step 410 from decision 494 and a new set of block test patterns is determined. Once image transmission is concluded, for example at the end of a remote computing session, method 400 ends at step 492.

FIG. 5 is an illustration of a repeating sequence 500 of four block test patterns TP1-TP4, which is an embodiment of sequence 180 enabled to provide test coverage of a 4×4 subject image block 174, each successive pattern in the sequence 500 maximizing the probability of detecting an image change by minimizing the area of the maximum untested continuous rectangle. Each column of Table 1 references the pixels in the sequence 500 associated with each of the four block test patterns—i.e., TP1 defines the first block test pattern comprising pixels 510-1 through 510-4, TP2 defines the second block test pattern comprising pixels 520-1 through 520-4, TP3 defines the third block test pattern comprising pixels 530-1 through 530-4, and TP4 defines the fourth block test pattern comprising pixels 540-1 through 540-4.

TABLE 1

| TP1 | TP2 | TP3 | TP4 |
|---|---|---|---|
| 510-1 | 520-1 | 530-1 | 540-1 |
| 510-2 | 520-2 | 530-2 | 540-2 |
| 510-3 | 520-3 | 530-3 | 540-3 |
| 510-4 | 520-4 | 530-4 | 540-4 |

Comparator 162 retrieves the pixels 510-1 thru 510-4 identified by TP1, followed by the pixels 520-1 thru 520-4 identified by TP2, followed by the pixels 530-1 thru 530-4 identified by TP3, followed by the pixels 540-1 thru 540-4 identified by TP4, before returning to TP1.

FIG. 6 is an illustration of a repeating sequence 600 of five block test patterns TP1-TP5, which is an embodiment of sequence 180 enabled to provide test coverage of a 5×5 subject image block 174, each successive pattern in the sequence 600 maximizing the probability of detecting an image change by minimizing the area of the maximum untested continuous rectangle. Each column of Table 2 references the pixels in the sequence 600 associated with each of the five test patterns (TP1-TP5).

TABLE 2

| TP1 | TP2 | TP3 | TP4 | TP5 |
|---|---|---|---|---|
| 610-1 | 620-1 | 630-1 | 640-1 | 650-1 |
| 610-2 | 620-2 | 630-2 | 640-2 | 650-2 |
| 610-3 | 620-3 | 630-3 | 640-3 | 650-3 |
| 610-4 | 620-4 | 630-4 | 640-4 | 650-4 |
| 610-5 | 620-5 | 630-5 | 640-5 | 650-5 |

Referring to Table 2, comparator 162 retrieves the pixels 610-1 thru 610-5 identified by TP1, followed by the pixels 620-1 thru 620-5 identified by TP2, followed by the pixels 630-1 thru 630-5 identified by TP3 and so on, before returning to TP1.

FIG. 7 is an illustration of a repeating sequence 700 of six block test patterns TP1-TP6 which is an embodiment of sequence 180 enabled to provide test coverage of a 6×6 subject image block 174, each successive pattern in the sequence 700 maximizing the probability of detecting an image change by minimizing the area of the maximum untested continuous rectangle. Each column of Table 3 references the pixels in the sequence 700 associated with each of the six test patterns (TP1-TP6).

TABLE 3

| TP1 | TP2 | TP3 | TP4 | TP5 | TP6 |
|---|---|---|---|---|---|
| 710-1 | 720-1 | 730-1 | 740-1 | 750-1 | 760-1 |
| 710-2 | 720-2 | 730-2 | 740-2 | 750-2 | 760-2 |
| 710-3 | 720-3 | 730-3 | 740-3 | 750-3 | 760-3 |
| 710-4 | 720-4 | 730-4 | 740-4 | 750-4 | 760-4 |
| 710-5 | 720-5 | 730-5 | 740-5 | 750-5 | 760-5 |
| 710-6 | 720-6 | 730-6 | 740-6 | 750-6 | 760-6 |

Referring to Table 3, comparator 162 retrieves the pixels 710-1 thru 710-6 identified by TP1, followed by the pixels 720-1 thru 720-6 identified by TP2, followed by the pixels 730-1 thru 730-6 identified by TP3 and so on, before returning to TP1.

FIG. 8 is an illustration of a repeating sequence 800 of seven block test patterns TP1-TP7 which is an embodiment of sequence 180 enabled to provide test coverage of a 7×7 subject image block 174, each successive pattern in the sequence 800 maximizing the probability of detecting an image change by minimizing the area of the maximum untested continuous rectangle. Each column of Table 4 references the pixels in the sequence 800 associated with each of the seven test patterns (TP1-TP7).

TABLE 4

| TP1 | TP2 | TP3 | TP4 | TP5 | TP6 | TP7 |
|---|---|---|---|---|---|---|
| 810-1 | 820-1 | 830-1 | 840-1 | 850-1 | 860-1 | 870-1 |
| 810-2 | 820-2 | 830-2 | 840-2 | 850-2 | 860-2 | 870-2 |
| 810-3 | 820-3 | 830-3 | 840-3 | 850-3 | 860-3 | 870-3 |
| 810-4 | 820-4 | 830-4 | 840-4 | 850-4 | 860-4 | 870-4 |
| 810-5 | 820-5 | 830-5 | 840-5 | 850-5 | 860-5 | 870-5 |
| 810-6 | 820-6 | 830-6 | 840-6 | 850-6 | 860-6 | 870-6 |
| 810-7 | 820-7 | 830-7 | 840-7 | 850-7 | 860-7 | 870-7 |

Referring to Table 4, comparator 162 retrieves the pixels 810-1 thru 810-7 identified by TP1, followed by the pixels 820-1 thru 820-7 identified by TP2, followed by the pixels 830-1 thru 830-7 identified by TP3 and so on, before returning to TP1.

FIG. 9 is an illustration of a repeating sequence 900 of eight block test patterns TP1-TP8 which is an embodiment of sequence 180 enabled to provide test coverage of a 8×8 subject image block 174, each successive pattern in the sequence 900 maximizing the probability of detecting an image change by minimizing the area of the maximum untested continuous rectangle. Each column of Table 5 references the pixels in the sequence 900 associated with each of the eight test patterns (TP1-TP8).

TABLE 5

| TP1 | TP2 | TP3 | TP4 | TP5 | TP6 | TP7 | TP8 |
|---|---|---|---|---|---|---|---|
| 910-1 | 920-1 | 930-1 | 940-1 | 950-1 | 960-1 | 970-1 | 980-1 |
| 910-2 | 920-2 | 930-2 | 940-2 | 950-2 | 960-2 | 970-2 | 980-2 |
| 910-3 | 920-3 | 930-3 | 940-3 | 950-3 | 960-3 | 970-3 | 980-3 |
| 910-4 | 920-4 | 930-4 | 940-4 | 950-4 | 960-4 | 970-4 | 980-4 |
| 910-5 | 920-5 | 930-5 | 940-5 | 950-5 | 960-5 | 970-5 | 980-5 |

TABLE 5-continued

| TP1 | TP2 | TP3 | TP4 | TP5 | TP6 | TP7 | TP8 |
|---|---|---|---|---|---|---|---|
| 910-6 | 920-6 | 930-6 | 940-6 | 950-6 | 960-6 | 970-6 | 980-6 |
| 910-7 | 920-7 | 930-7 | 940-7 | 950-7 | 960-7 | 970-7 | 980-7 |
| 910-8 | 920-8 | 930-8 | 940-8 | 950-8 | 960-8 | 970-8 | 980-8 |

Referring to Table 5, comparator 162 retrieves the pixels 910-1 thru 910-8 identified by TP1, followed by the pixels 920-1 thru 920-8 identified by TP2, followed by the pixels 930-1 thru 930-8 identified by TP3 and so on, before returning to TP1.

Repeating sequence 900 provides an optimal set of test patterns for sampling squares of 8×8 pixels. Sequence 900 consists of 8 test patterns (TP1-TP8), each with 8 sampling points. When applied one at a time to the subject image block 174, each test pattern of sequence 900 guarantees to not miss any rectangle with an area larger than 8 pixels. When all 8 test patterns are applied to the subject image block 174, they will sample every single pixel in the sampling square.

Figure 10:
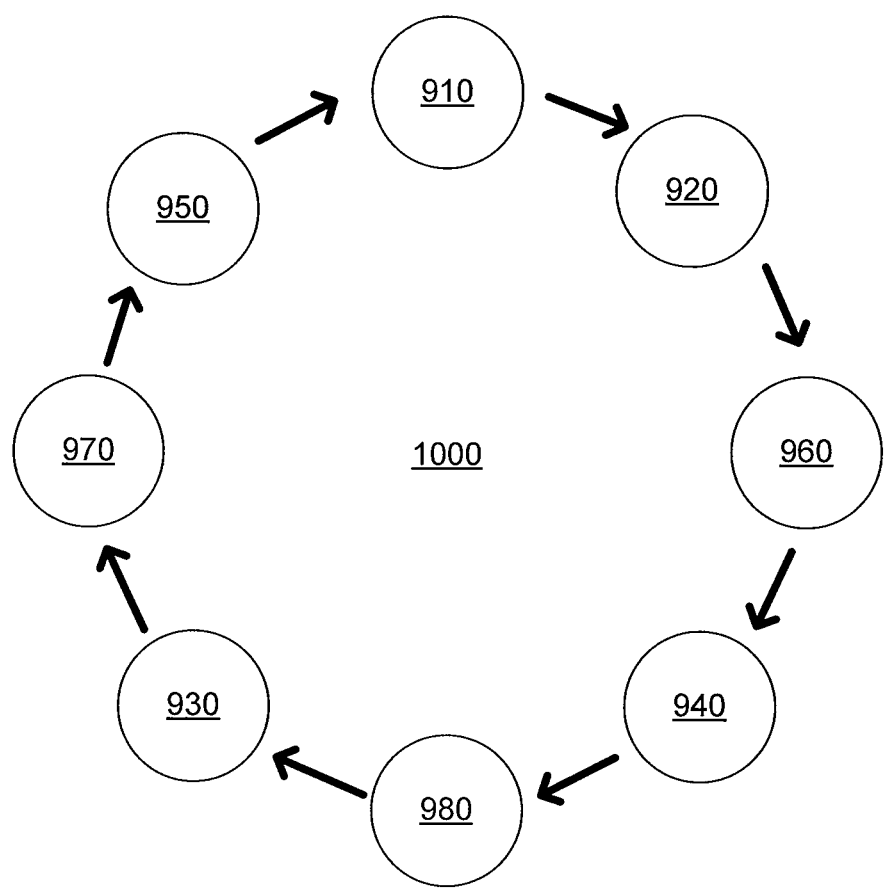
FIG. 10 is an illustration of an optimal test pattern ordering for a repeating sequence of eight test patterns in accordance with one or more embodiments of the present invention.

A refinement on the ordering of block test patterns TP1-TP8 in Table 5 is illustrated in FIG. 10 which shows the optimal ordering of the corresponding pixels for block test patterns TP1-TP8 such that when different numbers of these block test patterns have been applied to the subject image block 174, the size of the overall unsampled area is minimized. FIG. 10 illustrates the optimal test pattern ordering for a repeating sequence 1000 of eight block test patterns comprising the eight block test patterns TP1-TP8 for pixels 910 through 980 shown in FIG. 9, given the requirements to i) enter or exit the repeating sequence 1000 at any position; ii) minimize the mean maximum missed rectangle (MMMR) over the repeating sequence 1000; and iii) provide 100% coverage with the 8 block test patterns TP1-TP8. In an embodiment, the MMMR comprises the accumulated sum of sequential missed areas (in terms of largest unsampled rectangle) over a complete iteration of the repeating sequence 1000, re-computed for each starting point in the repeating sequence 1000, the eight resultant accumulated sums then averaged to provide a quantitative indication of merit for a particular block test pattern ordering. The block test pattern order for sequence 1000 has been computed by i) enumerating all possible permutations of the 8 block test patterns TP1-TP8 (i.e., 8! Permutations), ii) determining the MMMR for each permutation and iii) selecting the order with the lowest MMMR.

Each column of Table 6 discloses the maximum unsampled rectangle (i.e., biggest area of untested pixels expressed as a pixel count) for the repeating sequence 1000 based on a start position (i.e., an initial test pattern) indicated in the first row of Table 6.

TABLE 6

|  | 910 | 920 | 960 | 940 | 980 | 930 | 970 | 950 |
|---|---|---|---|---|---|---|---|---|
| 1$^{st}$ TP | 8 | 8 | 8 | 8 | 8 | 8 | 8 | 8 |
| 2$^{nd}$ TP | 6 | 4 | 5 | 4 | 6 | 4 | 5 | 4 |
| 3$^{rd}$ TP | 4 | 3 | 3 | 4 | 4 | 3 | 3 | 4 |
| 4$^{th}$ TP | 3 | 1 | 3 | 2 | 3 | 1 | 3 | 2 |
| 5$^{th}$ TP | 1 | 1 | 2 | 2 | 1 | 1 | 2 | 2 |
| 6$^{th}$ TP | 1 | 1 | 2 | 1 | 1 | 1 | 2 | 1 |
| 7$^{th}$ TP | 1 | 1 | 1 | 1 | 1 | 1 | 1 | 1 |
| 8$^{th}$ TP | 0 | 0 | 0 | 0 | 0 | 0 | 0 | 0 |

Sequence 1000 has an MMMR of 22.95 which may be computed from Table 6 by summing columns and dividing by eight. The worst case MMMR (i.e., worst ordering) for the block test patterns TP1-TP8 of Table 5 is 29.00 and average MMMR is 25.51. A similar approach is used to determine lowest MMMR and optimal ordering for the repeating sequences 500, 600, 700 and 800.

Figure 11:
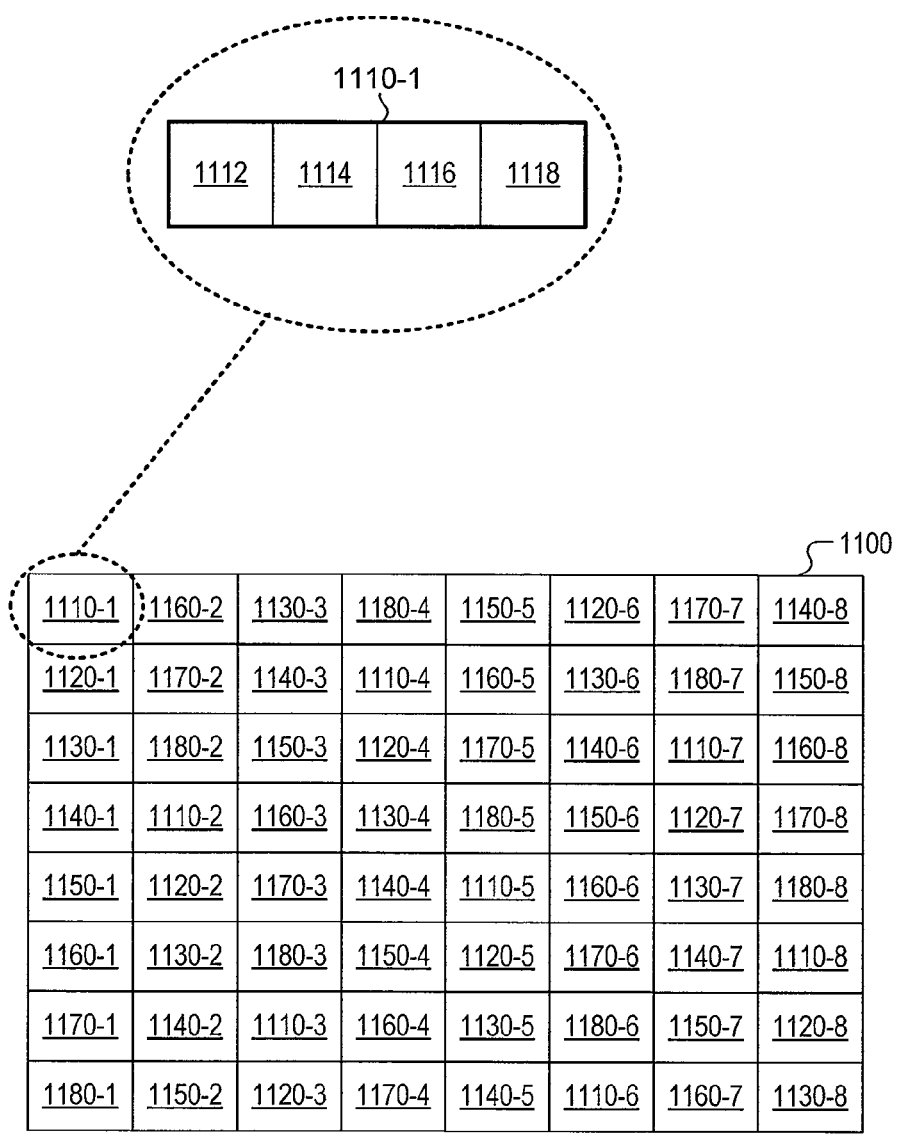
FIG. 11 is an illustration of a non-rectangular repeating sequence in accordance with one or more embodiments of the present invention.

FIG. 11 is an illustration of a repeating sequence 1100 of eight test patterns TP1-TP8, which is an embodiment of sequence 180 enabled to provide test coverage of a non-rectangular 32×8 subject image block 174, each successive pattern in the sequence 1100 maximizing the probability of detecting an image change. Sequence 1100 provides improved performance by enabling concurrent processing of groups of four pixels, as might be implemented on a processor system 112 with Streaming SIMD Extensions (SSE) instruction capabilities.

Each column of Table 7 discloses 8 groups of sequential pixels identified by each test pattern (TP1-TP8) in the sequence 1100. Group 1110-1 comprises pixels identified by locations 1112, 1114, 1116 and 1118 shown in FIG. 11 and so on.

TABLE 7

| TP1 | TP2 | TP3 | TP4 | TP5 | TP6 | TP7 | TP8 |
|---|---|---|---|---|---|---|---|
| 1110-1 | 1120-1 | 1130-1 | 1140-1 | 1150-1 | 1160-1 | 1170-1 | 1180-1 |
| 1110-2 | 1120-2 | 1130-2 | 1140-2 | 1150-2 | 1160-2 | 1170-2 | 1180-2 |
| 1110-3 | 1120-3 | 1130-3 | 1140-3 | 1150-3 | 1160-3 | 1170-3 | 1180-3 |
| 1110-4 | 1120-4 | 1130-4 | 1140-4 | 1150-4 | 1160-4 | 1170-4 | 1180-4 |
| 1110-5 | 1120-5 | 1130-5 | 1140-5 | 1150-5 | 1160-5 | 1170-5 | 1180-5 |
| 1110-6 | 1120-6 | 1130-6 | 1140-6 | 1150-6 | 1160-6 | 1170-6 | 1180-6 |
| 1110-7 | 1120-7 | 1130-7 | 1140-7 | 1150-7 | 1160-7 | 1170-7 | 1180-7 |
| 1110-8 | 1120-8 | 1130-8 | 1140-8 | 1150-8 | 1160-8 | 1170-8 | 1180-8 |

A set of SSE-enabled computer-executable instructions associated with comparator 162 concurrently retrieves the various groups of pixels 1110-1 thru 1110-8 identified by TP1, followed by the various groups of pixels 1120-1 thru 1120-8 identified by TP2, followed by the various groups of pixels 1130-1 thru 1130-8 identified by TP3 and so on.

Figure 12:
FIG. 12 is a block diagram of another embodiment of a repeating sequence of four test patterns that enables early detection of diagonal image patterns.

FIG. 12 is an illustration of a repeating sequence 1200 of four test patterns TP1-TP4, which is an embodiment of sequence 180 enabled to provide test coverage of a 4×4 subject image block 174. Unlike sequence 500 which minimizes the area of the maximum untested continuous rectangle but may allow for delayed detection of changed diagonal patterns that traverse multiple image blocks, sequence 1200 increase the probability of such diagonal patterns being detected early in the sequence by offsetting the target comparison pixels in TP1 from the diagonal line.

Each column of Table 12 references the pixels in the sequence 1200 associated with each of the four test patterns (TP1-TP4).

TABLE 8

| TP1 | TP2 | TP3 | TP4 |
|---|---|---|---|
| 1210-1 | 1220-1 | 1230-1 | 1240-1 |
| 1210-2 | 1220-2 | 1230-2 | 1240-2 |
| 1210-3 | 1220-3 | 1230-3 | 1240-3 |
| 1210-4 | 1220-4 | 1230-4 | 1240-4 |

Comparator 162 retrieves the pixels 1210-1 thru 1210-4 identified by TP1, followed by the pixels 1220-1 thru 1220-4 identified by TP2, followed by the pixels 1230-1 thru 1230-4 identified by TP3, followed by the pixels 1240-1 thru 1240-4 identified by TP4, before returning to TP1.

A determination as to whether sequence 500 or sequence 1200 provides the minimum observable errors (typically manifested as sporadic display artifacts) for a given display image might be initiated based on the detection of sporadic pixel changes intermixed within a defined area over a number of consecutive frames. Alternatively, a configuration setting (such as a group policy object) may be made available to the user. Another approach is to periodically switch between the two different sequences or select a different sequence providing less sparse coverage. For example, if 8×8 sequence 900 is replace with four 4×4 sequences (e.g., sequence 500 or sequence 1200) covering the same subject image block, the number of pixels tested on each comparison cycle is doubled.

While the foregoing is directed to embodiments of the present invention, other and further embodiments of the invention may be devised without departing from the basic scope thereof, and the scope thereof is determined by the claims that follow.

The invention claimed is:

1. A method of encoding an input image divided into a set of image blocks and stored in computer readable memory, the method comprising:
   determining a sequence of block test patterns, wherein each block test pattern of the sequence (i) identifies, for each image block of the set, a separate portion of the image block; and (ii) minimizes a maximum size of an undetected image feature of the input image when used on all image blocks of the set;
   assembling, by a computer, an active block test pattern comprising one of the block test patterns of the sequence;
   comparing, by the computer, based on the active block test pattern, at least one image block of the set with a reference image comprising a previously encoded copy of the input image to generate a block change detection; and
   encoding, by an encoder, based on the block change detection, a changed image block of the at least one image block to generate a portion of an encoded image, wherein the sequence is a repeating sequence; for each image block of the set, an assembly of all block test patterns of the sequence identifies an entire image block; the active block test pattern comprises a combination of at least two sequential block test patterns of the sequence; and the sequence is determined to minimize maximum untested portion sizes of the input image resulting from sequential combinations of the block test patterns of the sequence.

2. The method of claim 1, wherein encoding the changed image block comprises encoding a selection of neighboring image blocks adjacent to the at least one image block.

3. The method of claim 1, wherein each block test pattern of the sequence is determined based on at least one of (i) memory access methods of the computer, (ii) data comparison methods of the computer or (iii) a number of block test patterns in the sequence.

4. The method of claim 1, wherein the assembling, the comparing and the encoding are performed independent of timing of updates to the input image.

5. The method of claim 1, wherein comparing the at least one image block is scheduled based on an update indication associated with a change to the input image.

6. The method of claim 1, further comprising obtaining the input image from a source image.

7. The method of claim 6, wherein, based on the block change detection, an additional image block is copied from the source image to the input image.

8. The method of claim 1, wherein comparing the at least one image block is based on a block change detection history.

9. The method of claim 1, wherein assembling the active block test pattern comprises combining a sequential selection of the repeating sequence based on a period of time since previously comparing the at least one image block.

10. The method of claim 1, wherein determining the sequence is based on a planned encoding frequency of the input image.

11. The method of claim 10, wherein the planned encoding frequency is determined based on at least one of (a) an available network bandwidth used to transmit the portion of the encoded image, or (b) an available processing bandwidth of the computer.

12. The method of claim 1, wherein each block test pattern of the sequence minimizes a maximum untested rectangle of the input image when comparing, based on the active block test pattern, all image blocks of the set with the reference image.

13. The method of claim 1, further comprising updating, based on the block change detection, respective blocks of the reference image with the at least one image block.

14. A non-transitory computer readable storage medium for storing computer instructions that, when executed by a processor within a computer system, cause the processor to perform a method of encoding an input image divided into a set of image blocks and stored in computer readable memory, the method comprising:
   assembling, by a computer, an active block test pattern comprising a block test pattern of a sequence of block test patterns, wherein each block test pattern of the sequence (i) identifies, for each image block of the set, a separate portion of the image block; and (ii) minimizes a maximum size of an undetected image feature of the input image when used on all image blocks of the set;
   comparing, by the computer, based on the active block test pattern, at least one image block of the set with a reference image comprising a previously encoded copy of the input image to generate a block change detection; and
   encoding, by an encoder, based on the block change detection, a changed image block of the at least one image block to generate a portion of an encoded image, wherein the sequence is a repeating sequence; for each image block of the set, an assembly of all block test patterns of the sequence identifies an entire image block; the active block test pattern comprises a combination of at least two sequential block test patterns of the sequence; and the sequence is determined to minimize maximum untested portion sizes of the input image resulting from sequential combinations of the block test patterns of the sequence.

15. The non-transitory computer readable storage medium of claim 14, wherein each block test pattern of the sequence is determined based on at least one of (i) memory access methods of the computer, (ii) data comparison methods of the computer or (iii) a number of block test patterns in the sequence.

16. The non-transitory computer readable storage medium of claim 14, wherein assembling the active block test pattern comprises combining a sequential selection of the repeating sequence based on a period of time since previously comparing the at least one image block.

17. The non-transitory computer readable storage medium of claim 14, wherein the sequence is determined based on a planned encoding frequency of the input image and the planned encoding frequency is determined based on at least one of (a) an available network bandwidth used to transmit the portion of the encoded image, or (b) an available processing bandwidth of the computer.

18. The non-transitory computer readable storage medium of claim 14, wherein the method further comprises updating, based on the block change detection, respective blocks of the reference image with the at least one image block.

* * * * *